US007591448B2

(12) United States Patent
Martin et al.

(10) Patent No.: US 7,591,448 B2
(45) Date of Patent: Sep. 22, 2009

(54) HYDRAULIC CONTROL VALVE SYSTEM

(75) Inventors: Thierry Martin, Maiche (FR); Alfonso Heredia, Les Fins (FR); Jean-Michel Meyer, Sonceboz (CH); Hubert Poinceau, Bienne (CH)

(73) Assignee: Societe Industrielle De Sonceboz S.A., Soncebox (CH)

(*) Notice: Subject to any disclaimer, the term of this patent is extended or adjusted under 35 U.S.C. 154(b) by 141 days.

(21) Appl. No.: 11/823,185

(22) Filed: Jun. 27, 2007

(65) Prior Publication Data

US 2008/0121828 A1 May 29, 2008

Related U.S. Application Data

(63) Continuation-in-part of application No. 11/604,432, filed on Nov. 27, 2006.

(51) Int. Cl.
*F16K 31/02* (2006.01)

(52) U.S. Cl. ............................. 251/129.11; 251/129.2; 137/884

(58) Field of Classification Search ............ 251/129.11, 251/129.12, 129.13, 129.2; 137/269, 597, 137/884

See application file for complete search history.

(56) References Cited

U.S. PATENT DOCUMENTS

| | | | | |
|---|---|---|---|---|
| 3,839,662 | A * | 10/1974 | N'Guyen Van | 318/160 |
| 4,650,159 | A | 3/1987 | Shimamura | |
| 6,095,485 | A * | 8/2000 | Lebkuchner et al. | 251/77 |
| 6,109,298 | A * | 8/2000 | Kaneko et al. | 137/551 |
| 6,612,332 | B2 * | 9/2003 | Miyazoe et al. | 137/552 |
| 6,764,060 | B2 * | 7/2004 | Fukano et al. | 251/129.12 |
| 6,857,981 | B2 * | 2/2005 | Hori et al. | 475/149 |
| 7,121,240 | B2 * | 10/2006 | Tani | 123/90.17 |

FOREIGN PATENT DOCUMENTS

DE 199 48 379 A1 4/2001

* cited by examiner

*Primary Examiner*—John K Fristoe, Jr.
(74) *Attorney, Agent, or Firm*—Baker & Daniels LLP

(57) ABSTRACT

A hydraulic control valve system comprising a hydraulic valve block with a plurality of control valve segments arranged in a juxtaposed manner, each control valve segment comprising a first line, for example a pump line, a second line, for example a return line, and a displaceable valve rod adapted to open and close the first line, respectively close and open the second line to varying degrees depending on a position of the valve rod. The valve system further has a plurality of actuators arranged in a juxtaposed manner, one actuator for each valve segment, each actuator comprising an electrical motor connected to a respective said valve rod through a coupling mechanism.

14 Claims, 5 Drawing Sheets

1b
2
4
H
H
H 2
6
8, 8', 8"
4

6
1c
8, 8', 8"
2

T
DS'''
21c
10
22
58
57
56
21a
23
53f
5b
29
8'''
53d
33
27
40
39
59'
L
12
21b
53c
53e
34
32'''
42
36'''
52
35a
30
53a
45
55c
55b
R
55a
35a
HR'''
HS'''
H
53b
37
25
54b
43
41
38
54a
35b

HYDRAULIC CONTROL VALVE SYSTEM

This application is a continuation-in-part application of application Ser. No. 11/604,432 filed Nov. 27, 2006, the entirety of which is incorporated herein by reference.

BACKGROUND OF THE INVENTION

This invention relates to a valve system for controlling a hydraulic drive system.

Hydraulic drive systems are used in many mechanical load applications, for example in construction equipment, farming equipment, fork lifts, cranes and other hydraulically driven work systems. Hydraulic pistons driving an associated mechanical organ are controlled by valves controlling the flow of hydraulic fluid through a pump line and a return line, in order to fill or to empty the hydraulic piston. The degree of opening and closing of the pump line, respectively return line control valves, determines the rate of displacement and position of the associated mechanical load member. It is therefore important to ensure accuracy in the opening and closing of the control valves and to reduce sensitivity of the control valve opening to pressure in the hydraulic system.

In certain conventional systems, hydraulic valves are controlled by means of electro-magnetic actuators combined with a hydraulic amplifier to provide the required force to displace and to hold the valve rod. It is however difficult with such control systems to obtain precise and rigid control of the valves. Another known means of controlling valves is by way of an actuator comprising an electrical motor driving the valve control rod, as described in DE 19 948 379 or U.S. Pat. No. 4,650,159.

The use of a stepping motor to actuate a valve rod is advantageous in view of the high rigidity it confers to the hydraulic valve control system as well as enabling high precision in the opening and closing of the valves through control of the stepping motor. A major disadvantage of such systems is however the size of the stepping motor and the limited number of hydraulic valves that may be arranged in a juxtaposed manner. In DE 19 948 379 for example, the hydraulic block has four pairs of control valves mounted in a juxtaposed manner, each control valve being actuated by an electrical stepping motor connected to the valve rod via a link arm, each of the motors being arranged in a different orientation. In this configuration, additional valves cannot be added to the valve block and the different arrangements of the various electrical motors increases manufacturing and assembly costs.

SUMMARY OF THE INVENTION

In view of the aforegoing, it is an object of the invention to provide a hydraulic control valve system with a plurality of juxtaposed valves that is compact, economical to manufacture and assemble, and that provides precise and rigid control of the opening and closing of the hydraulic valves.

It is a further object of this invention to provide a hydraulic control valve system that may be easily expanded to include more control valves in a juxtaposed manner in a compact block.

Objects of this invention have been achieved by providing a hydraulic control valve system comprising a hydraulic valve block with a plurality of control valve segments arranged in a juxtaposed manner, each control valve segment comprising a first line, for example a pump line, a second line, for example a return line, and a displaceable valve rod adapted to open and close the first line, respectively close and open the second line to varying degrees depending on a position of the valve rod, the valve system further comprising a plurality of actuators arranged in a juxtaposed manner, one actuator for each valve segment, each actuator comprising an electrical motor connected to a respective said valve rod through a coupling mechanism, each motor having a rotor and a stator having a plurality of coils positioned around the rotor, approximate mid points of the coils defining a virtual circle around the rotor, whereby a ratio DS/HS of a diameter DS of the virtual circle defined by mid-points of the coils of the stator divided by an overall height HS of the coils in a direction parallel to an axis of rotation of the rotor is greater than 1.6.

Advantageously, the actuator has width equal or smaller than each hydraulic valve segment such that a plurality of identical actuators can be assembled in a juxtaposed manner to actuate a plurality of respective hydraulic valves in a compact valve block while benefiting from the positional rigidity and control accuracy of the electrical motor.

The coupling mechanism of the actuator may advantageously comprise a rack and pinion, the rack fixed directly to or forming an extension of the valve rod.

The electrical motor may advantageously be a stepping motor, the stator comprising a plurality of coils positioned around radially extending arms of the stator. The stator preferably comprises at least six coils, preferably eight. In view of obtaining high accuracy and rigidity when displacing the valve rod, the motor preferably has a large number of steps per revolution, preferably more than 100, for example around 200 steps. The large number of steps is also particularly advantageous in providing a very low positional hysteresis when changing drive direction. In the embodiment shown, the rotor has around 50 teeth.

Further objects and advantageous features of the invention will be apparent from the claims and the following detailed description and figures.

DETAILED DESCRIPTION

Figures 1A, 1B, 1C:
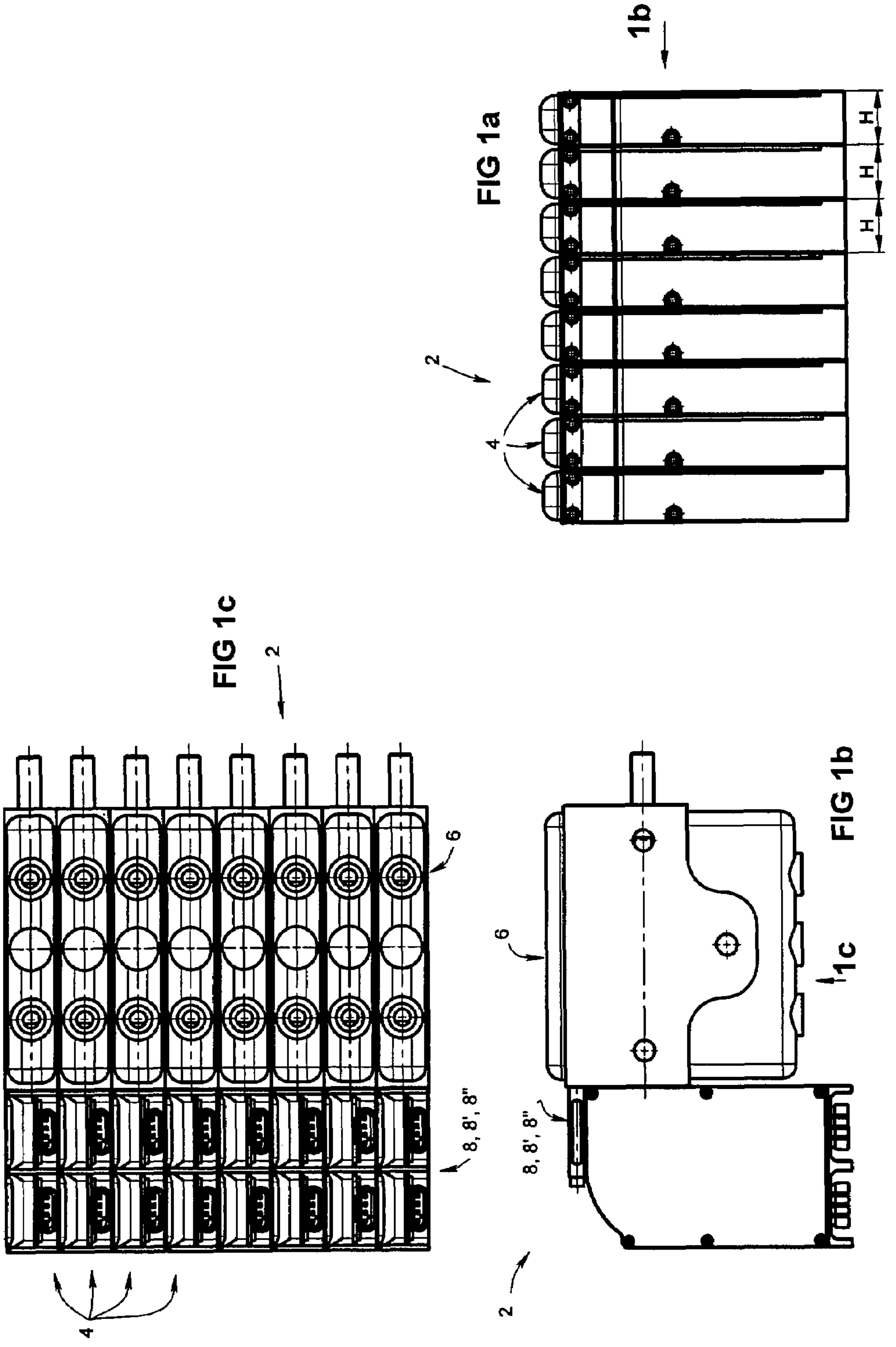
FIG. 1*a* is a view of a hydraulic control valve system according to this invention.
FIG. 1*b* is a view in the direction of arrow 1*b* of FIG. 1.
FIG. 1*c* is a view in the direction of arrow 1*c* of FIG. 1*b;*

Referring to the figures, a hydraulic control valve system 2 comprises a plurality of juxtaposed hydraulic control valve segments 4, each segment comprising a hydraulic valve device 6 and an actuator 8, 8', 8'', 8'''. The hydraulic valve devices of the control valve segments may be provided as separate components assembled together to form a single block or alternatively may be made out of a single block or out of a number of components assembled together as a single block.

Each hydraulic valve device comprises a body portion 10 within which are provided channels 12, 14, 16, 17, 19 through which hydraulic fluid flows. The channels include a first channel 12 and a second channel 14 that are intended to be connected to hydraulic lines leading to a hydraulic piston for driving a mechanical load. The channels further include input channels 17, 19 intended to be connected to a hydraulic pump system that provides the hydraulic pressure, and an evacuation channel 16 for return of hydraulic fluid. The first and second channels 12, 14 may be connected respectively to a first line (such as a pump line) and a second line (such as a return line). The hydraulic valve further comprises a valve rod 22 slidably mounted in a valve rod cavity 28 that communicates with the channels 12, 14, 16, 17, 19. The valve rod is movable in linear direction T along a valve rod axis 13. The valve rod has reduced cross-section portions 24, 26 to interconnect or to disconnect the first line, respectively second line, with the input channels 17, 19 so as to open and close the first line 12 or the second line 14, for forward or reverse movement of the hydraulic piston connected thereto.

The translational position of the valve rod in the cavity determines how much the valves are opened or closed which in turn varies the pressure and flow of hydraulic fluid to or from the hydraulic drive system connected to the valve. It is therefore important to have an accurate displacement and positioning of the valve rod, as well as a high rigidity in holding and stabilizing the valve rod in any given position. This accurate positioning and rigid holding of the valve rod is provided by the actuator 8, 8', 8'', 8''' mounted on an actuator mounting face 21*a* of the hydraulic valve body 10 through which extends an extremity 23 of the valve rod 22.

The actuator comprises a housing 30, an electrical motor mounted in the housing coupled to the valve rod 22 via a coupling mechanism 33. The motor comprises a stator 32, 32', 32'', 32''' rigidly fixed to the housing 30, and a rotor 36, 36', 36'', 36''' rotatably mounted via bearings 41 to the stator or housing. The axis R (FIG. 2*b*) of the rotation of the rotor extends in an axial direction A, orthogonal to the valve rod axis 13 and a major plane generally defined by the valve rod 22 and first and second hydraulic channels 12,14.

The coupling mechanism 33 comprises a rotor gear 38 rigidly fixed to the rotor engaging a reduction gear 25 having a large gear wheel 37 and a pinion 39 rotatably mounted on an axis 43 fixed to the housing. Instead of the reduction gear, it is also possible to have a transmission belt around the rotor gear 38 and the pinion 39. The reduction gear pinion 39 engages a toothed rack 40 that is coupled to, and in line with, the extremity 23 of the valve rod 22. Alternatively, the toothed rack may be integrally formed with the valve rod. Other coupling mechanisms known in the art that transform a rotation movement of the rotor into a linear translational movement of the valve rod may also be used without departing from the scope of this invention.

The toothed rack 40 is supported and guided by a roller 27 bearing against a face 29 of the toothed rack opposite the pinion 39.

The actuator housing 30 has a generally parallelepiped shape bounded by opposed major faces 53*a*, 53*b* and narrow minor faces 53*c*, 53*d*, 53*e*, 53*f*, one of which is a mounting face. The housing comprises a base part 35*a*, preferably of a cast non-magnetic metal alloy and a cover part 35*b*. The base part comprises a cavity 52 for lodging the stator 32 of the motor, and cavities 55*a*, 55*b*, 55*c* for lodging the rotor bearing 41 and the axes 43*a*, 45*a* of the reduction gear 25 and the support roller 27 respectively. The cover part 35*b* may also be provided with corresponding cavities 54*a*, 54*b* for lodging the corresponding rotor bearing 41 and reduction gear axis 43 in a compact manner while advantageously allowing axial assembly of the motor and coupling mechanism with the housing parts 35*a*, 35*b*.

The narrow mounting face 53*c* of the actuator housing 30, for mounting against the mounting face 21*a* of the hydraulic valve body, comprises a passage 56 for the valve rod 22 coupled with the toothed rack 40, the passage 56 being formed by a tubular extension 57 adapted to be received in a corresponding cavity 58 in the hydraulic valve body portion 10. The tubular extension 57 enables the actuator to be accurately positioned with respect to the hydraulic valve body portion 10 and moreover guides and positions the valve rod extremity 23 accurately into the actuator.

Figures 5A, 5B:
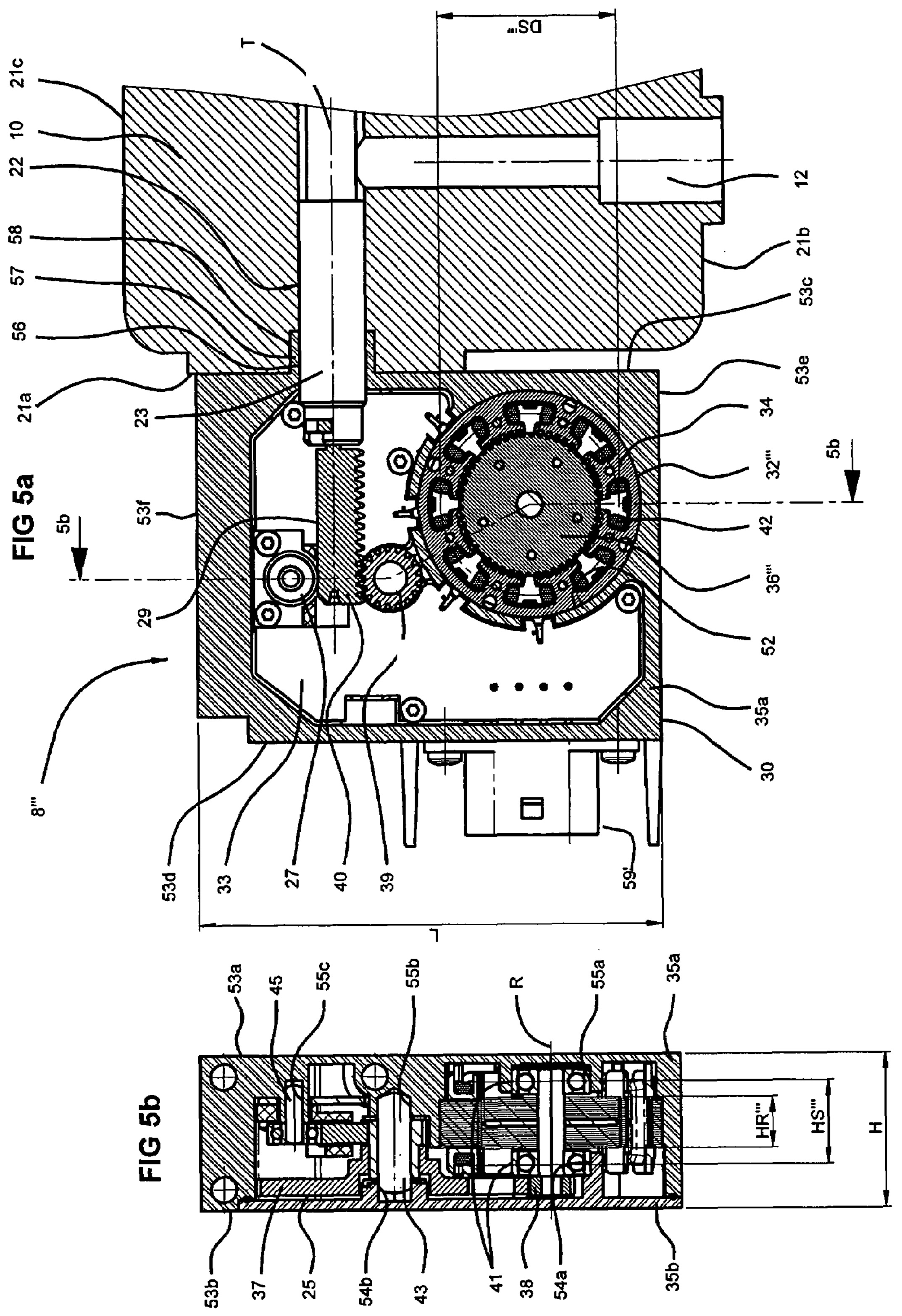
FIG. 5*a* is a cross-sectional view of part of a variant of the hydraulic control valve system of FIG. 2*a*.
FIG. 5*b* is a cross-sectional view through line 5*b*-5*b* of FIG. 5*a.*

Electrical connectors 59, 59' extend out of the housing 30 on a narrow minor face 53*e* (see FIG. 2*a*) on the side where the hydraulic first and second channels 12 to 14 are connected, or on the narrow minor face 53*d* opposite the mounting face 53*c* (see FIG. 5*a*).

The stator of the electrical motor comprises a plurality of coils 42 mounted on a magnetic circuit structure with radially and inwardly extending stator arms 34, preferably formed from stacked laminated sheets of ferro-magnetic material, for generating a varying magnetic field that drives the rotor.

In the embodiment shown in FIGS. 2*a*, 2*b*, and 5*a*, 5*b*, the motor is a stepping motor. The rotor comprises a permanent magnet 44 in the shape of a disc sandwiched between a pair of magnetic flux conducting discs 46, for example discs made of stacked laminated ferro-magnetic material. The stator preferably comprises at least six coils 42 arranged around the circumference of the rotor, mounted on the radially extending stator arms 34.

In view of obtaining high accuracy and rigidity when displacing the valve rod, the stepping motor preferably has a large number of steps per revolution, preferably more than 100, for example around 200 steps. The large number of steps is also particularly advantageous in providing a very low positional hysteresis when changing drive direction, and a high resolution. Both the rotor and the stator of the stepping motor preferably have a large number of teeth 47, preferably more than 40. The stator of the stepping motor embodiment preferably has at least six coils, but preferably eight or more.

The ratio DS/HS of the average diameter DS of a virtual circle defined by the approximate centers of the stator coils, with respect to the overall height HS of the coils, is advantageously greater than 1.6 and preferably 1.7 or more. The ratio DR/HR of the outer diameter DR of the rotor with respect to the overall axial height HR of the rotor discs, the axial height being measured in the direction of the axis of rotation R, is preferably greater than 2.5 and preferably 3 or more.

Figure 2A:
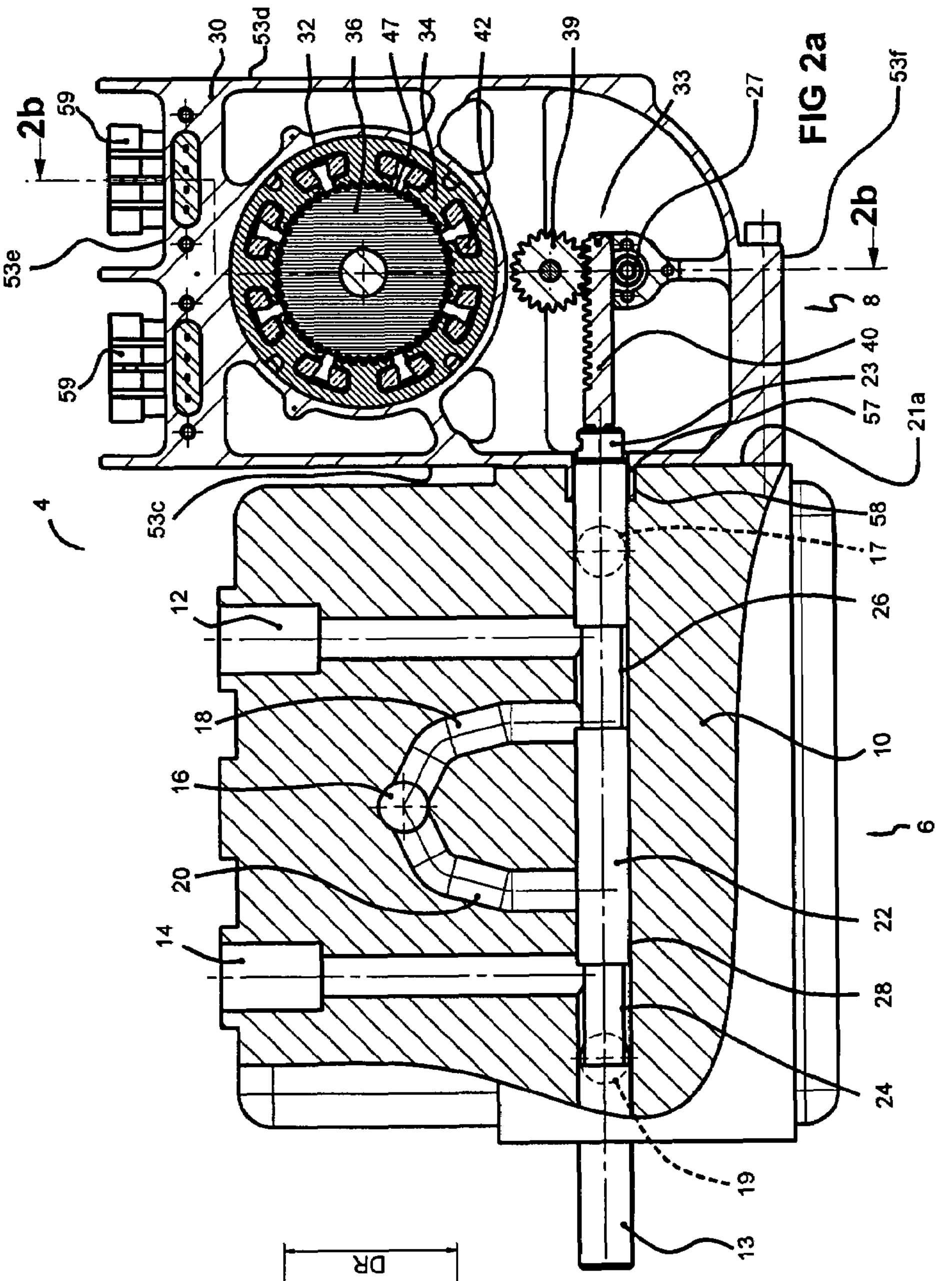
FIG. 2*a* is a longitudinal cross-sectional view through one of the segments shown in FIGS. 1*a*-1*c;*
Figure 2B:
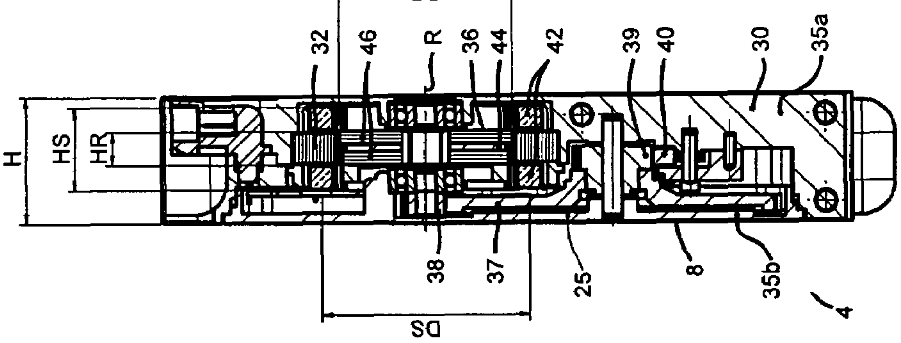
FIG. 2*b* is a cross-sectional view through line 2*b*-2*b* of FIG. 2*a;*

In the variant of FIGS. 5*a*, 5*b*, the ratio DS/HS is approximately 1.7 whereas in the variant of the FIGS. 2*a*, 2*b* the ratio DS/HS is approximately equal to 2.2.

The aforementioned ratios enable the actuator to have the same thickness H or less than the width of conventional hydraulic valve segments, which are typically around 40 mm wide, while providing the required torque and stability for displacing the valve rod under typical pressures found in valve control systems for agricultural equipments, fork lifts, construction equipment and the like. The electrical actuators may thus be assembled in an identical and juxtaposed manner to any plurality of hydraulic valve segments of a hydraulic valve block.

Figure 3A:
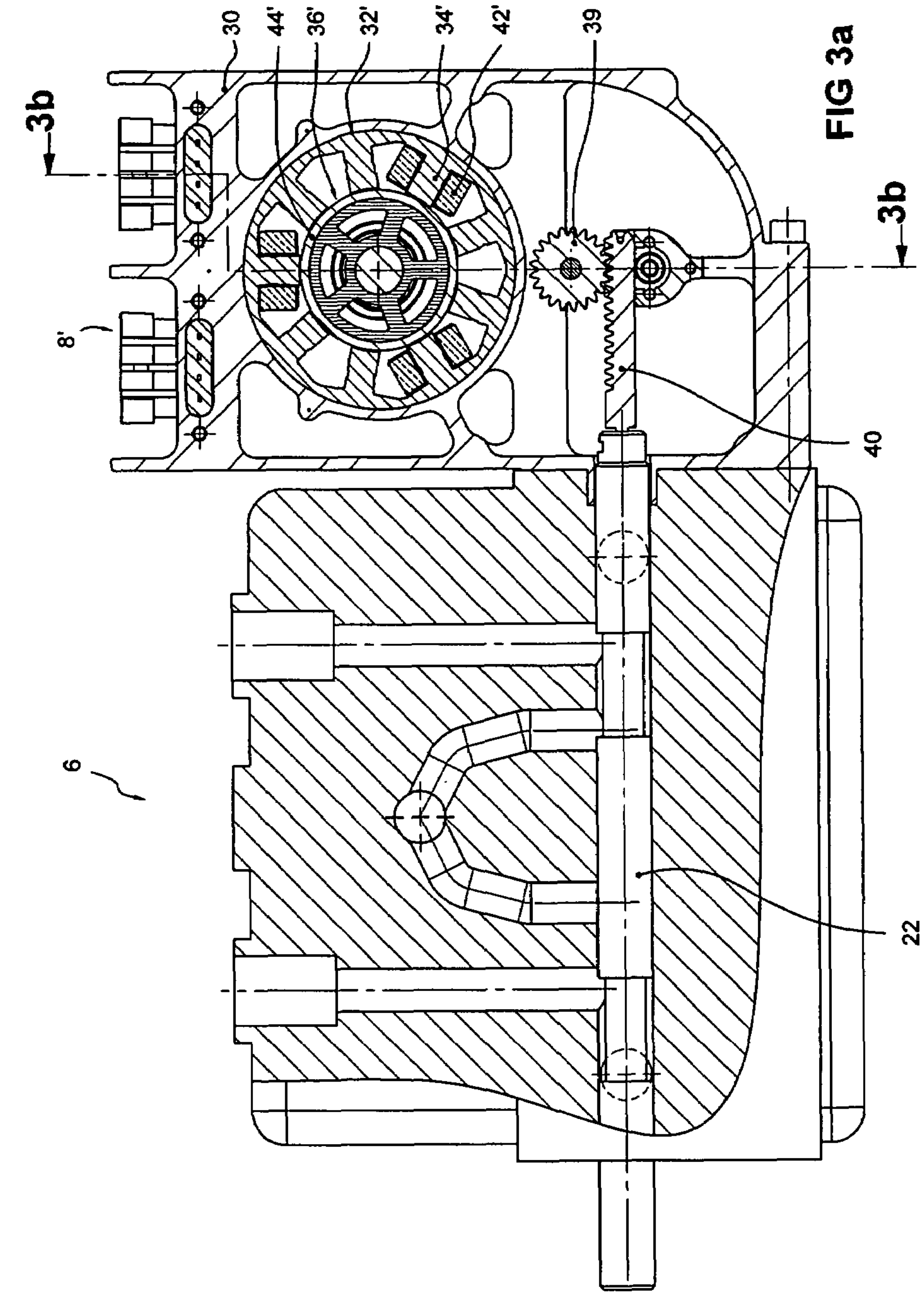
FIG. 3*a* is a cross-sectional view similar to FIG. 2*a*, except that it shows a variant of the electrical actuator.
Figure 3B:
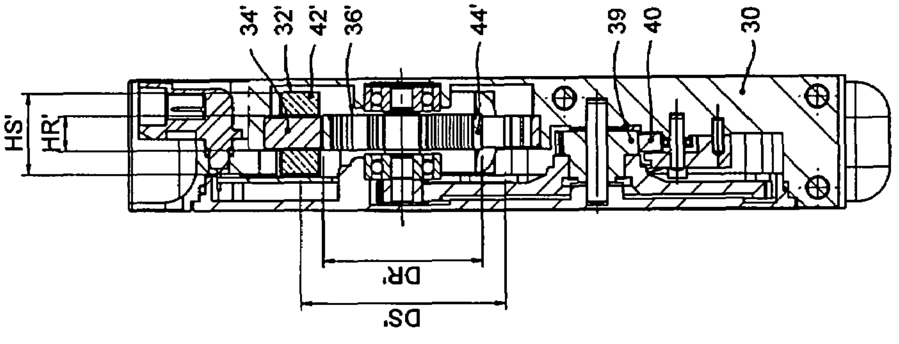
FIG. 3*b* is a cross-sectional view through line 3*b*-3*b* of FIG. 3*a;*

In the embodiment shown in FIGS. 3*a* and 3*b*, the motor of the electrical actuator is a brushless DC motor comprising a ferro-magnetic stator 32' with a plurality of radially and inwardly directed stator arms or poles 34'. The coils 42' are mounted in a spaced apart manner around the periphery of the rotor on certain of the poles 34'. The rotor 36' comprises an annular permanent magnet 44' that has a plurality of adjacent alternately polarized segments.

The brushless DC motor generates a lower torque than the stepping motor variant illustrated in FIGS. 2*a*, 2*b*, but the rotor 36' rotates at a higher speed such that the gear down ratio of the gear system acting on the rack 40 is greater than the gearing down ratio of the coupling mechanism of the stepping motor actuator. In view of the higher gearing down, reversibility of the hydraulic system (in the situation where the electric motor is switched-off) is not as good as with the stepping motor. Certain applications however do not require reversibility in the case of a power failure or for other reasons, and in certain applications reversibility may on the contrary not be desired.

Figure 4A:
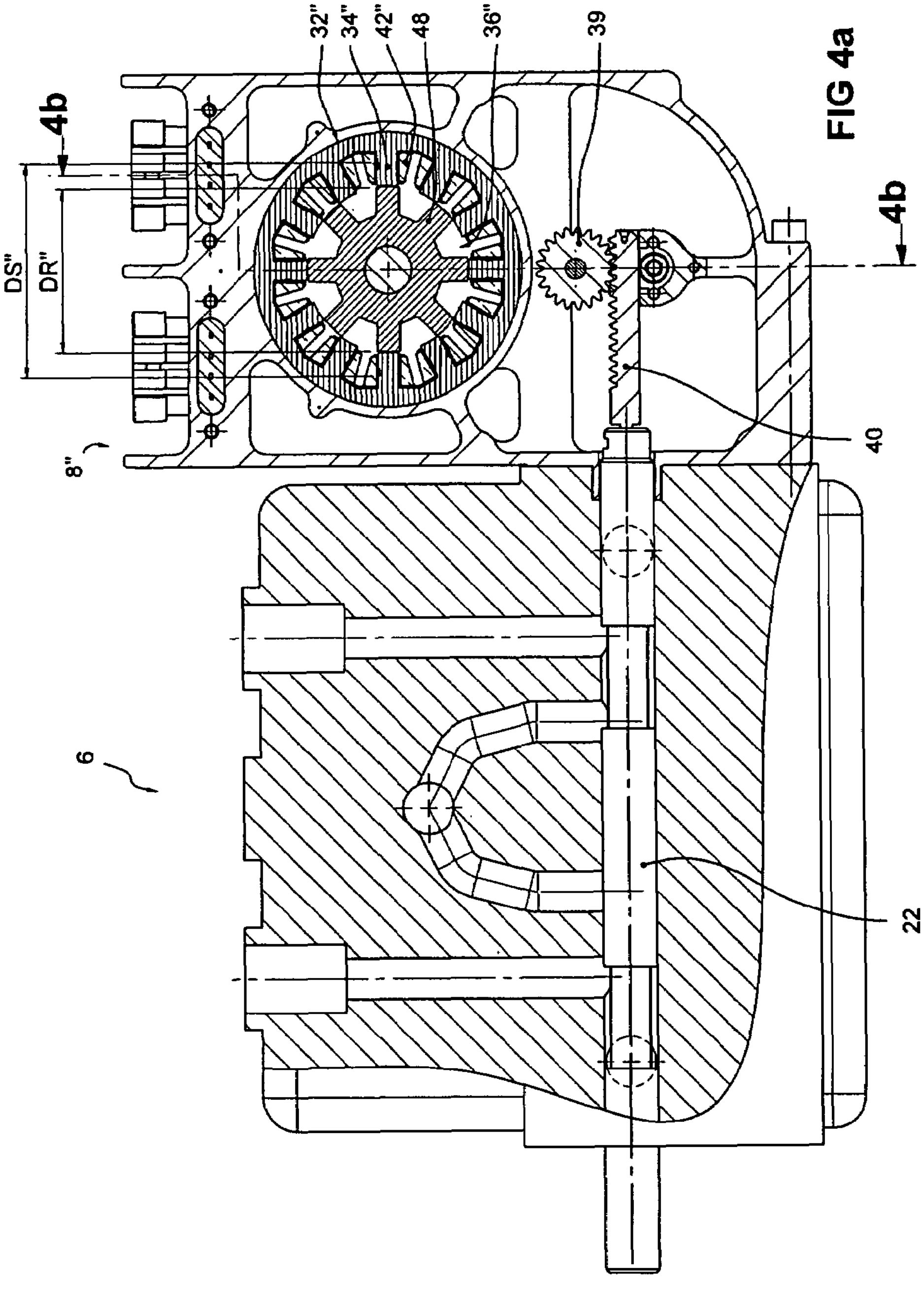
FIG. 4*a* is a cross-sectional view similar to FIG. 2*a* except that it shows yet another variant of an electrical actuator.
Figure 4B:
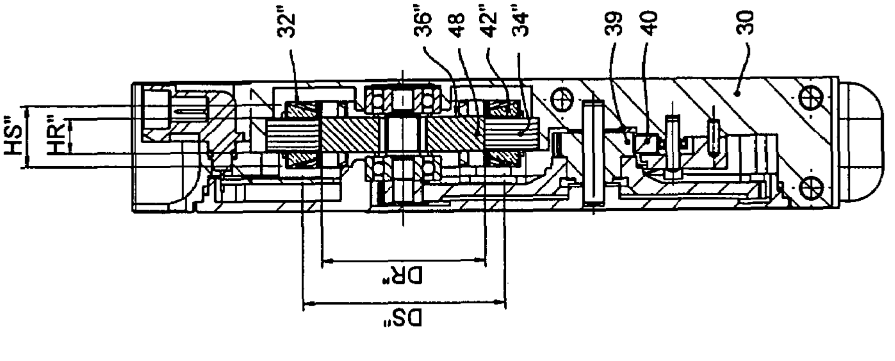
FIG. 4*b* is a cross-sectional view through line 4*b*-4*b* of FIG. 4*a;*

Referring now to FIGS. 4*a* and 4*b*, another embodiment is shown in which the electrical actuator comprises a variable reluctance motor comprising a ferro-magnetic stator 32" having a plurality of radially and inwardly directed stator arms or poles 34" around which coils 42" are mounted. In the case of a variable reluctance motor, the rotor 36" comprises a ferromagnetic body with a plurality of radially and outwardly directed poles 48, there being less rotor poles than stator poles. The stator coils generate a varying magnetic field that generates the equivalent of a rotating magnetic field attracting the rotor poles 48. In view of the fact that the variable reluctance motor does not generate any magnetic resistance when the electrical supply is switched off, the motor has a high reversibility and may therefore advantageously be used in applications where reversibility is desired.

The overall height L of the actuator (i.e. the distance between the minor faces 53*e* and 53*f*) may advantageously be approximately equal to the height of the hydraulic valve body, such that the opposite minor faces 53*e*, 53*f* of the actuator do not extend substantially beyond corresponding faces 21*b*, 21*c* of the hydraulic valve body. In the variant of FIGS. 5*a*, 5*b*, the electrical connector 59', for connection of an external power supply and drive unit to the motor, projects from the minor face 53*d*, opposite the mounting face 53*c*, allowing easy and convenient access to the connectors.

Advantageously, the electrical motor actuators, which provide positional rigidity and control accuracy, have thicknesses equal or smaller than each hydraulic valve segment such that a plurality of identical actuators can be assembled in a juxtaposed manner to actuate a plurality of respective hydraulic valves, thus forming a compact yet performant hydraulic valve block system.

The invention claimed is:

1. A hydraulic control valve system comprising a hydraulic valve block with a plurality of control valve segments arranged in a juxtaposed manner, each control valve segment comprising a first line, a second line, and a displaceable valve rod adapted to open and close the first line, respectively close and open the second line to varying degrees depending on a position of the valve rod, the valve system further comprising a plurality of actuators arranged in a juxtaposed manner, one actuator for each valve segment, each actuator comprising an electrical motor mechanically coupled to a respective said valve rod through a coupling mechanism, each motor having a rotor and a stator, the stator comprising a plurality of coils arranged around the circumference of the rotor, whereby a ratio DS/HS, DS'/HS', DS"/HS", DS'"/HS'" of an average diameter DS, DS', DS", DS '" of a virtual circle through mid-points of said coils of the stator divided by an overall height HS, HS', HS", HS'" of said coils in a direction parallel to an axis of rotation of the rotor is greater than 1.6.

2. Hydraulic control valve system according to claim 1, wherein the ratio DS/HS, DS'/HS', DS"/HS", DS'"/HS'" is greater than 1.7.

3. Hydraulic control valve system according to claim 1, wherein the ratio DS/HS, DS'/HS', DS"/HS", DS'"/HS'" is greater than 2.

4. Hydraulic control valve system according to claim 1, wherein the coupling mechanism comprises a rack connected to and extending from an end of the valve rod, engaging a pinion mounted in the actuator and driven by the rotor.

5. Hydraulic control valve system according to claim 1, wherein the hydraulic valve block comprises more than four juxtaposed hydraulic control valve segments and associated actuators.

6. Hydraulic control valve system according to claim 1, wherein the motor is a stepping motor and the stator comprises six or more said coils arranged on radially extending arms of the stator.

7. Hydraulic control valve system according to claim 6, wherein the stator comprises at least eight said coils.

8. Hydraulic control valve system according to claim 6, wherein the motor has more than 100 steps per revolution.

9. Hydraulic control valve system according to claim 1, wherein the motor is a brushless DC motor.

10. Hydraulic control valve system according to claim 1, wherein the motor is a variable reluctance motor.

11. Hydraulic control valve system according to claim 1, wherein the actuators are mounted against a mounting face of each control valve segment of the hydraulic valve block through which an extremity of the respective valve rod extends.

12. Hydraulic control valve system according to claim 1, wherein the control valve segment and corresponding actuators have a width inferior or equal to 40 mm.

13. Hydraulic control valve system according to claim 1, wherein each actuator comprises a housing having a base part and a cover part, the base part cast from a non-magnetic alloy and comprising cavities for lodging the stator and axes supporting a reduction gear of the coupling mechanism.

14. Hydraulic control valve system according to claim 13, wherein the actuator housing comprises a tubular extension extending from a narrow mounting face, the extension receivable in a corresponding cavity in the hydraulic valve segment through which the valve rod extends.

* * * * *